(12) United States Patent
Czachor et al.

(10) Patent No.: US 7,637,110 B2
(45) Date of Patent: *Dec. 29, 2009

(54) METHODS AND APPARATUSES FOR ASSEMBLING A GAS TURBINE ENGINE

(75) Inventors: Robert P. Czachor, Cincinnati, OH (US); James Anthony Groeschen, Burlington, KY (US); Jason Paul Hoppa, West Chester, OH (US)

(73) Assignee: General Electric Company, Schenectady, NY (US)

( * ) Notice: Subject to any disclaimer, the term of this patent is extended or adjusted under 35 U.S.C. 154(b) by 542 days.

This patent is subject to a terminal disclaimer.

(21) Appl. No.: 11/290,115

(22) Filed: Nov. 30, 2005

(65) Prior Publication Data
US 2007/0119182 A1 May 31, 2007

(51) Int. Cl.
*F02C 7/20* (2006.01)
(52) U.S. Cl. ............................ 60/796; 415/136; 60/800
(58) Field of Classification Search ........... 60/796–800, 60/752–760; 415/136, 138, 139, 209.2, 209.4, 415/189, 190
See application file for complete search history.

(56) References Cited

U.S. PATENT DOCUMENTS

| | | | | |
|---|---|---|---|---|
| 4,078,812 | A * | 3/1978 | Beckershoff | 277/543 |
| 4,614,082 | A | 9/1986 | Sterman et al. | |
| 5,180,281 | A * | 1/1993 | Burge et al. | 415/209.2 |
| 5,211,541 | A | 5/1993 | Fledderjohn et al. | |
| 5,224,825 | A * | 7/1993 | Strang et al. | 415/209.3 |
| 5,483,792 | A | 1/1996 | Czachor et al. | |
| 5,524,430 | A | 6/1996 | Mazeaud et al. | |
| 5,622,475 | A | 4/1997 | Hayner et al. | |
| 6,382,905 | B1 * | 5/2002 | Czachor et al. | 415/9 |
| 6,397,603 | B1 * | 6/2002 | Edmondson et al. | 60/753 |
| 6,401,447 | B1 * | 6/2002 | Rice et al. | 60/796 |
| 6,449,952 | B1 * | 9/2002 | Emilianowicz et al. | 60/772 |
| 6,457,936 | B1 | 10/2002 | Leach et al. | |
| 6,895,757 | B2 * | 5/2005 | Mitchell et al. | 60/772 |
| 6,904,757 | B2 * | 6/2005 | Mitchell et al. | 60/800 |
| 6,935,836 | B2 * | 8/2005 | Ress et al. | 415/173.2 |
| 6,951,112 | B2 | 10/2005 | Czachor | |

(Continued)

FOREIGN PATENT DOCUMENTS

CH 363 661 A 8/1962

(Continued)

OTHER PUBLICATIONS

European Search Report, App. No. EP 06 12 4888 (Mar. 5, 2007).

*Primary Examiner*—William H Rodriguez
(74) *Attorney, Agent, or Firm*—William Scott Andes, Esq.; Armstrong Teasdale LLP (57) ABSTRACT

A method for assembling a gas turbine engine includes coupling a first structure within the gas turbine engine, wherein the first structure includes a plurality of sockets extending from a radially outer surface of the first structure, and coupling a second structure to the first structure by inserting a radial pin through the second structure and into each respective socket such that the first structure is aligned axially, circumferentially, and with respect to an engine centerline axis extending through the gas turbine engine, where the position of the pins relative to the second structure is adjustable.

16 Claims, 8 Drawing Sheets

U.S. PATENT DOCUMENTS

| | | | |
|---|---|---|---|
| 6,988,369 B2 * | 1/2006 | Conete et al. | 60/796 |
| 7,024,863 B2 * | 4/2006 | Morenko | 60/796 |
| 7,089,748 B2 * | 8/2006 | Tiemann | 60/800 |
| 7,249,462 B2 * | 7/2007 | Aumont et al. | 60/796 |
| 7,290,982 B2 * | 11/2007 | Girard et al. | 415/173.4 |
| 7,493,771 B2 * | 2/2009 | Lohmueller et al. | 60/796 |
| 2002/0184890 A1 * | 12/2002 | Camy et al. | 60/796 |
| 2003/0185674 A1 | 10/2003 | Alford et al. | |
| 2004/0118122 A1 * | 6/2004 | Mitchell et al. | 60/752 |
| 2004/0118127 A1 * | 6/2004 | Mitchell et al. | 60/796 |
| 2004/0250548 A1 * | 12/2004 | Howell et al. | 60/796 |
| 2008/0134683 A1 * | 6/2008 | Foale | 60/755 |

FOREIGN PATENT DOCUMENTS

| | | |
|---|---|---|
| EP | 1 054 137 A2 | 11/2000 |
| FR | 2 465 080 A1 | 3/1981 |
| GB | 2 263 733 A | 8/1993 |

* cited by examiner

METHODS AND APPARATUSES FOR ASSEMBLING A GAS TURBINE ENGINE

BACKGROUND OF THE INVENTION

This invention relates generally to gas turbine engines, and more particularly to methods and apparatus for assembling gas turbine engines.

At least some known gas turbine engines include axisymmetric structures, such as combustors for example. During operation, thermal differentials between the concentric axisymmetric flowpath components may result in thermal stresses being induced. Although providing for relative radial movement between the concentric axisymmetric structures may facilitate reducing such thermal stresses, such arrangements make it more difficult to maintain at least some of the axisymmetric hardware substantially concentric to the engine centerline axis to facilitate proper operation of the gas turbine engine. Moreover, thermal differentials between the axisymmetric structures may result in excessive loads resulting in relatively high cyclic stress and/or fatigue cracks in the axisymmetric structures.

Figure 1:
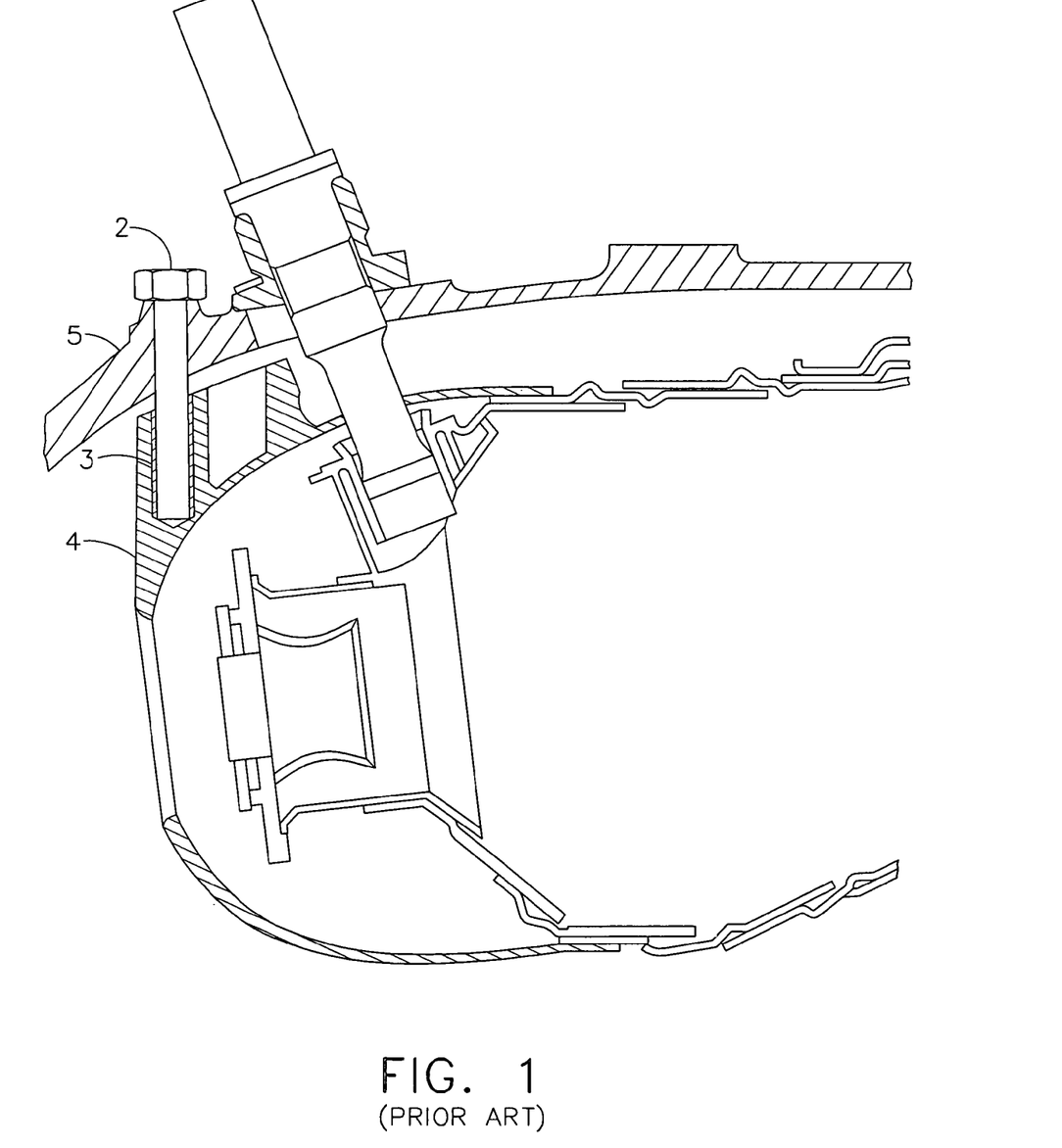
FIG. 1 is a cross-sectional view of a prior art radial pin.

For example, as shown in FIG. 1, at least one known gas turbine engine includes a combustor casing that includes a plurality of radially oriented pins 2 that engage female bushings 3 that are coupled to the combustor 4. The pins are threaded into the combustor outer casing 5, which surrounds the combustor. In operation, the combustor, which is considerably hotter than the casing, is free to expand in a radial direction.

However, as shown in FIG. 1, to assemble the combustor within the gas turbine engine, the dimensional tolerances of the components require a radial clearance in the fit of the male pin to the female bushing to permit assembly. As a result, during operation, only a portion of the radial pins support the axial load and react to tangential forces. As such, these radial pins may experience increased wear compared to other radial pins utilized to support the combustor. In addition, slight dimensional misalignment of either the pins, the bushing bores, or both, may cause the load to be concentrated on either the edge of the bushing and/or the end of the pin. This concentrated load on what is initially a point contact on the pin and/or bushing again may result in increased wear of the bushing and/or the pin.

BRIEF DESCRIPTION OF THE INVENTION

In one aspect, a method for assembling a gas turbine engine is provided. The method includes coupling a first structure within the gas turbine engine, wherein the first structure includes a plurality of sockets extending from a radially outer surface of the first structure, and coupling a second structure to the first structure by inserting a radial pin through the second structure and into each respective socket such that the first structure is aligned axially, circumferentially, and with respect to an engine centerline axis extending through the gas turbine engine.

In another aspect, an assembly for coupling an axisymmetric structure within the gas turbine engine is provided. The axisymmetric structure includes at least one mounting bushing extending from a radially outer surface of the axisymmetric structure. The assembly includes a pin having a crowned surface inserted at least partially into the mounting bushing such that the pin provides both axial and tangential support to the axisymmetric structure, and a retaining device to secure the pin to a portion of the gas turbine engine.

In a further aspect, a gas turbine engine is provided. The gas turbine engine includes an axisymmetric structure within the gas turbine engine, wherein the axisymmetric structure includes at least two mounting bushings extending from a radially outer surface of the axisymmetric structure, and an assembly for coupling the axisymmetric structure within the gas turbine engine. The assembly includes a pin having a crowned surface inserted at least partially into the mounting bushing such that the pin provides both axial and tangential support to the axisymmetric structure, and a retaining device to secure the pin to a portion of the gas turbine engine.

DETAILED DESCRIPTION OF THE INVENTION

Figure 2:
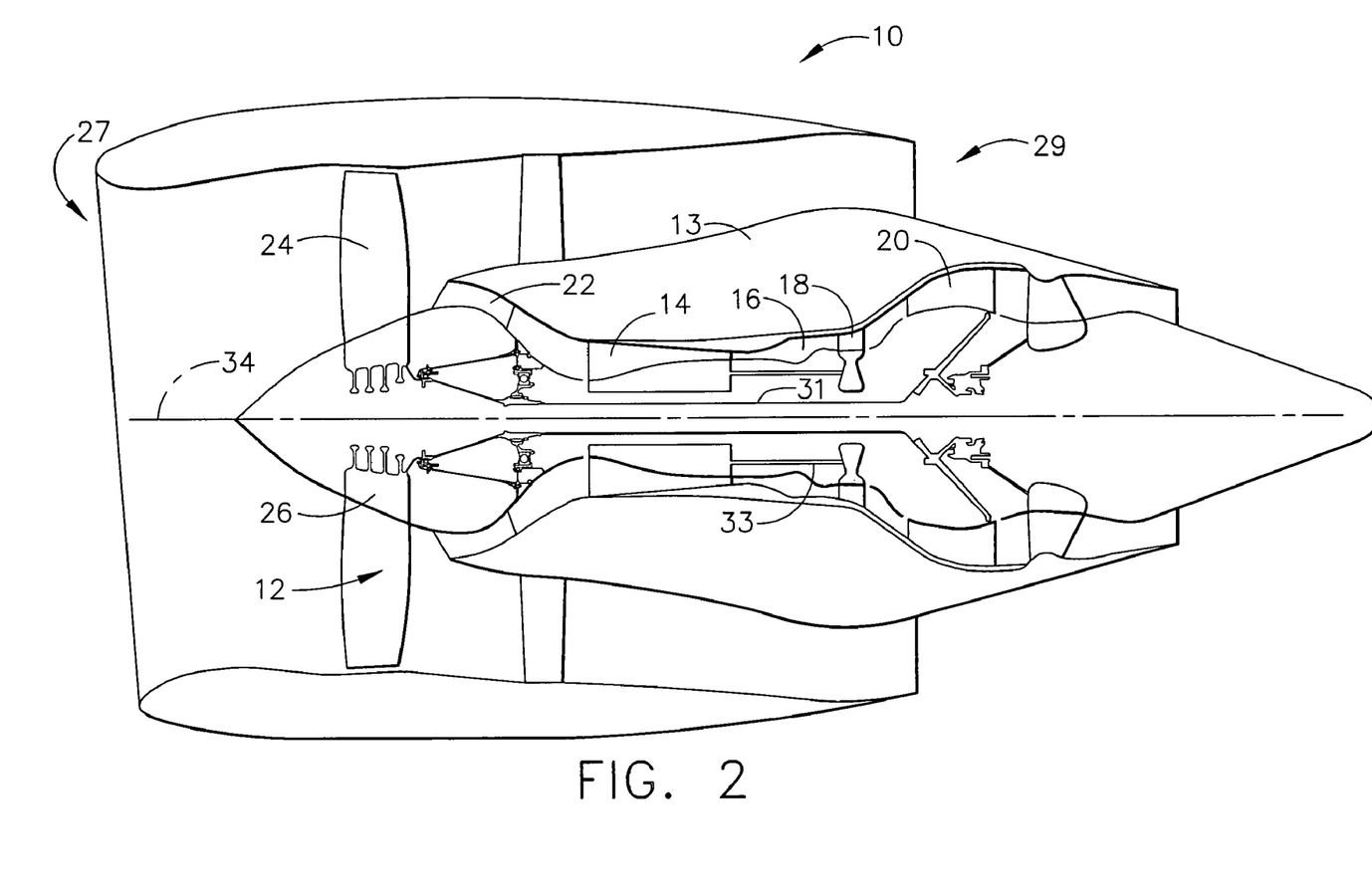
FIG. 2 is a schematic view of an exemplary gas turbine engine.

FIG. 2 is a schematic illustration of a gas turbine engine assembly 10 including a fan assembly 12 and a core engine 13 including a high pressure compressor 14, a combustor 16, and a high pressure turbine 18. In the exemplary embodiment, gas turbine engine assembly 10 also includes a low pressure turbine 20 and a booster 22. Fan assembly 12 includes an array of fan blades 24 extending radially outward from a rotor disc 26. Gas turbine engine assembly 10 has an intake side 27 and an exhaust side 29. In one embodiment, the gas turbine engine is a CF6-50 available from General Electric Company, Cincinnati, Ohio. Fan assembly 12, turbine 20, and booster 22 are coupled together by a first rotor shaft 31, and compressor 14 and turbine 18 are coupled together by a second rotor shaft 33.

During operation, air flows axially through fan assembly 12, in a direction that is substantially parallel to a central axis 34 extending through engine 10, and compressed air is supplied to high pressure compressor 14. The highly compressed air is delivered to combustor 16. Airflow (not shown in FIG. 2) from combustor 16 drives turbines 18 and 20, and turbine 20 drives fan assembly 12 by way of shaft 31.

Figure 3:
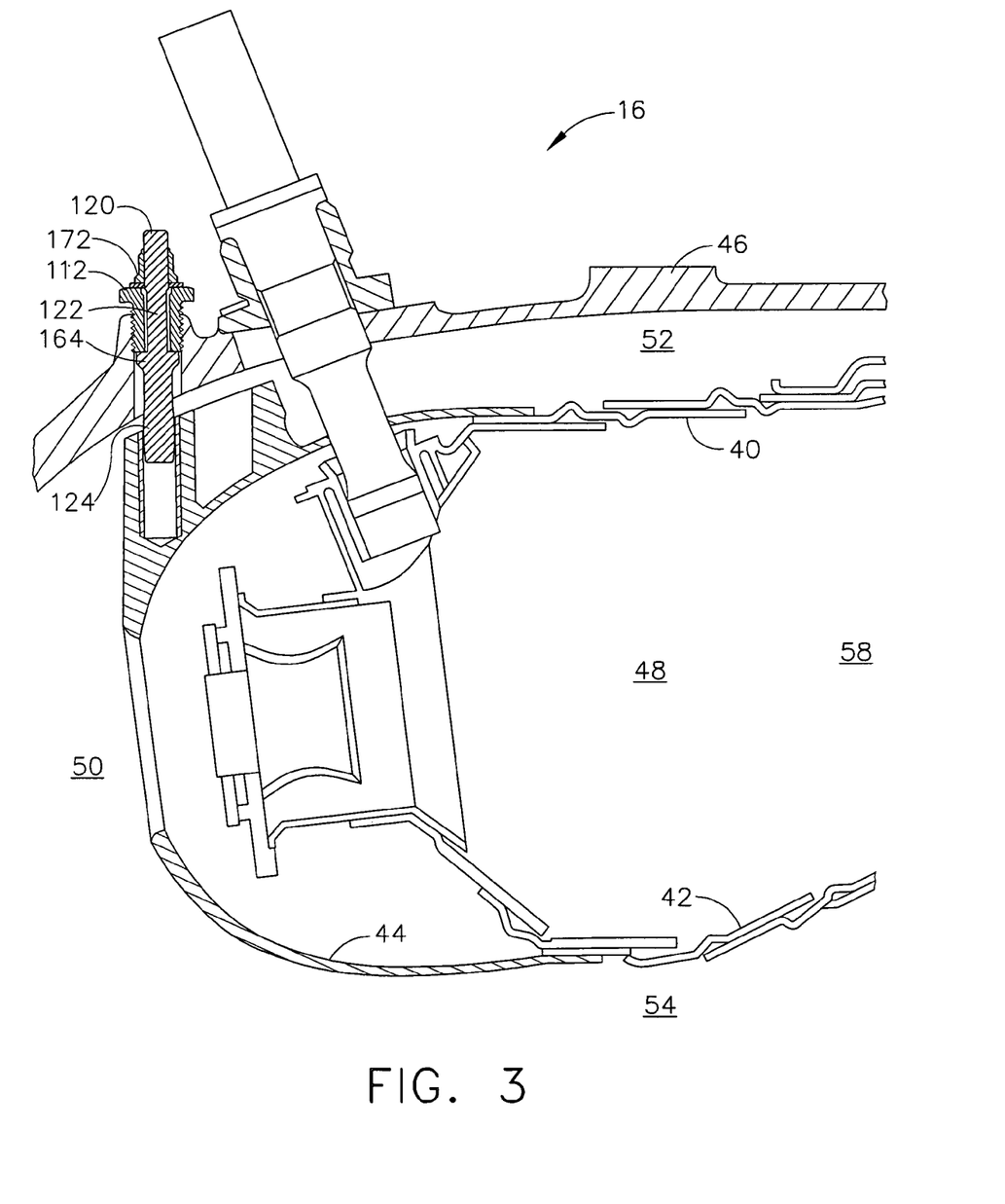
FIG. 3 is a cross-sectional view of a portion of the gas turbine engine shown in FIG. 1.

FIG. 3 is a cross-sectional view of combustor 16 shown in FIG. 2. In the exemplary embodiment, combustor 16 includes an annular outer liner 40, an annular inner liner 42, and a combustor dome assembly 44 extending between outer and inner liners 40 and 42, respectively.

Outer liner 40 and inner liner 42 are spaced radially inward from a combustor casing 46 and define a combustion chamber 48. Combustor casing 46 is generally annular and extends downstream from an exit 50 of a compressor, such as compressor 14 shown in FIG. 1. Outer liner 40 and combustor casing 46 define an outer passageway 52 and inner liner 42 and an inner support structure (not shown) define an inner passageway 54. Outer and inner liners 40 and 42, respectively, extend to a turbine inlet nozzle 58 disposed downstream from combustion chamber 48.

In the exemplary embodiment, combustor dome assembly 44 is arranged in a single annular configuration. In another embodiment, combustor dome assembly 44 is arranged in a double annular configuration. In a further embodiment, combustor dome assembly 44 is arranged in a triple annular configuration. In the exemplary embodiment, combustor dome assembly 44 provides structural support to an upstream end of combustor 16. More specifically, gas turbine engine assembly 10 includes an attachment assembly to facilitate securing combustor 16 within core gas turbine engine 13 utilizing combustor dome assembly 44.

Figure 4:
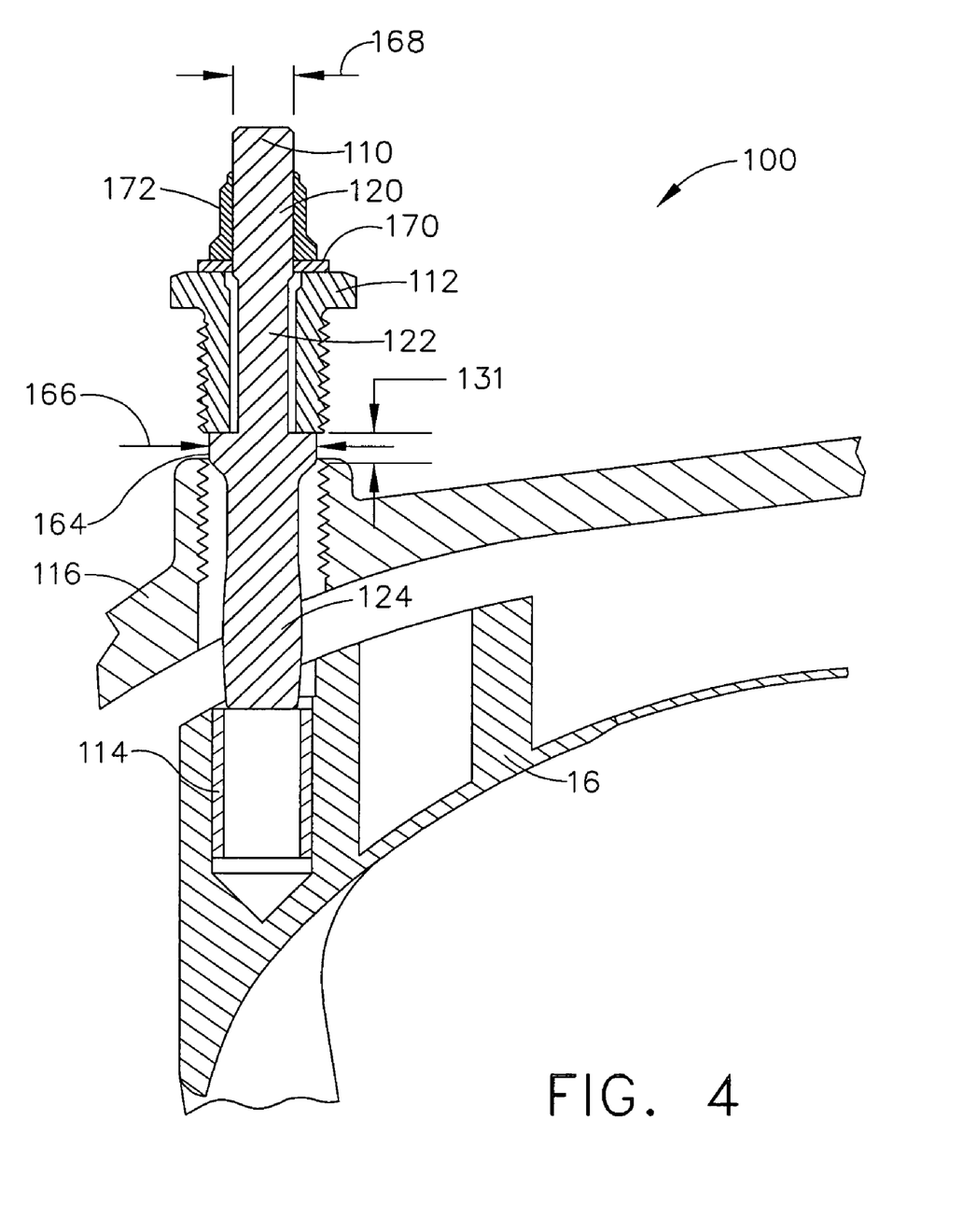
FIG. 4 is a cross-sectional view of an exemplary attachment assembly, during initial assembly, that may be utilized with the gas turbine engine shown in FIG. 1.
Figure 5:
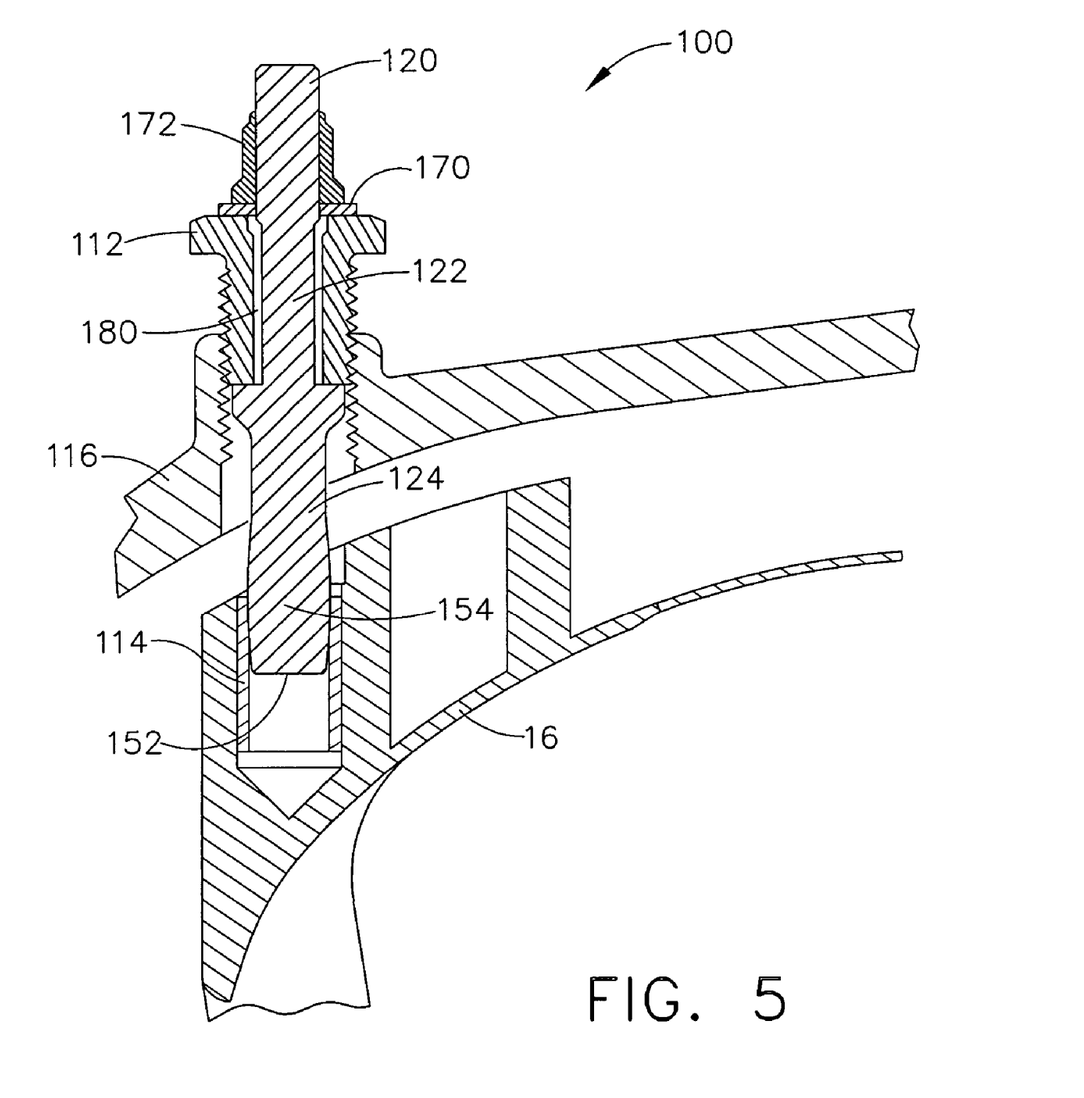
FIG. 5 is a cross-sectional view of the attachment assembly shown in FIG. 4 during final assembly.
Figure 6:
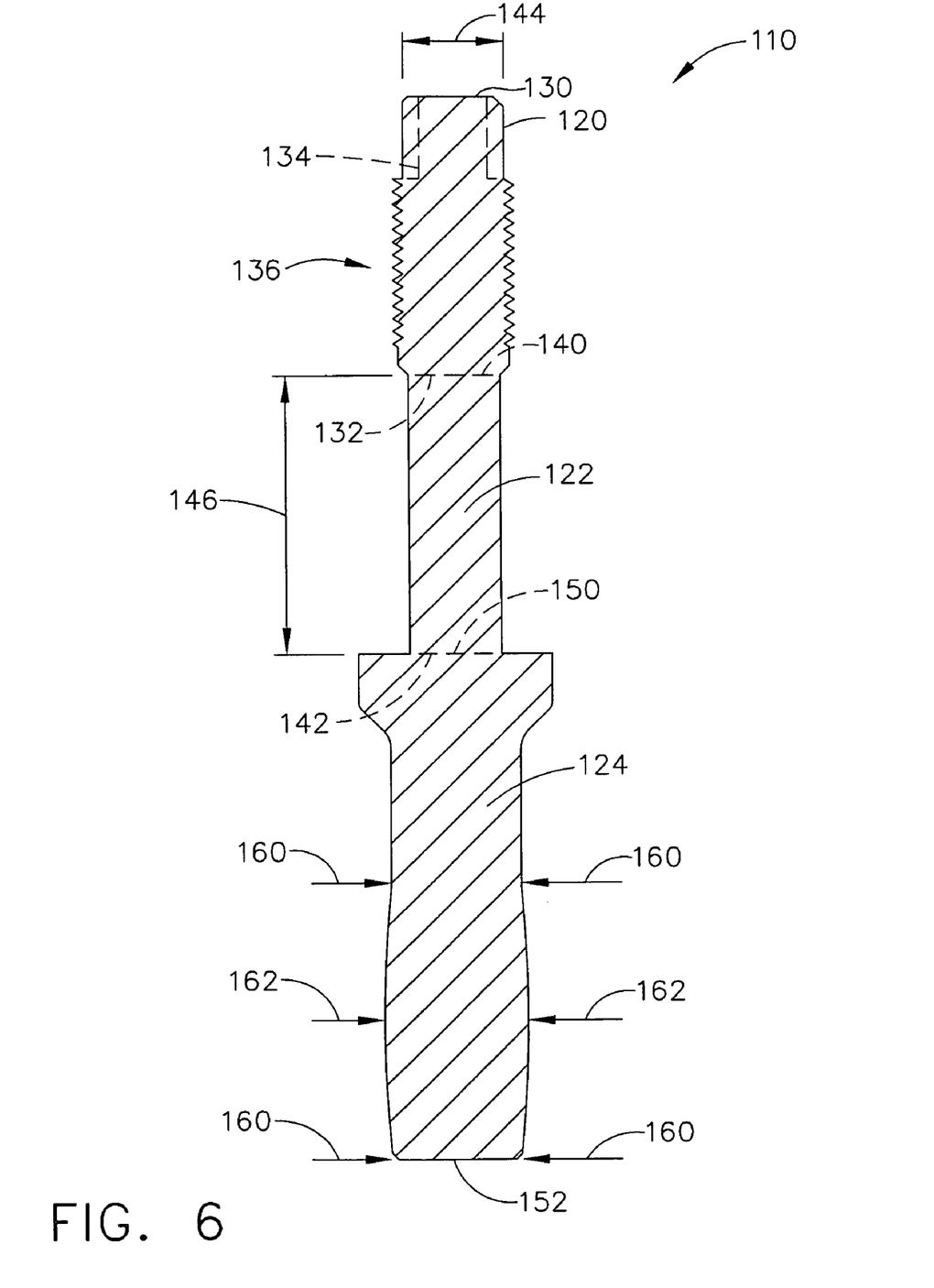
FIG. 6 is a cross-sectional view of a portion of the attachment assembly shown in FIGS. 4 and 5.

FIG. 4 is an exemplary attachment assembly 100, shown during initial assembly, that may be utilized to secure an axisymmetric structure, such as combustor 16 within a gas turbine engine, such as gas turbine engine 10. FIG. 5 is a second view of attachment assembly 100 during final assembly. FIG. 6 is a cross-sectional view of the alignment pin shown in FIGS. 4 and 5. Although, the attachment assemblies are described herein with respect to exemplary gas turbine engine 10, it should be realized that the attachment assemblies may be utilized to install and/or align an axisymmetric structure in a wide variety of gas turbine engines.

In the exemplary embodiment, attachment assembly 100 includes a plurality of radially oriented alignment pins 110 that each inserted through a respective threaded bushing 112 to engage a respective female bushing 114 that is coupled to combustor 16. During assembly, the alignment pins 110 are threaded into the combustor outer casing 116, which surrounds combustor 16.

More specifically, each alignment pin 110 includes a first portion 120, a second portion 122, and a third portion 124. In the exemplary embodiment, portions 120, 122 and 124 are formed as a unitary alignment pin 110. First portion 120 has a first end 130 that is utilized by an operator to hold alignment pin 110 during engine assembly and a second end 132 that is coupled to second portion 122. First end 130 has a shape that is configured to allow an operator to hold the end, for example, first end 130 may have at least two flat surfaces 134 to allow an operator to utilize a wrench to hold alignment pin 110. First portion 120 also includes a plurality of threads 136 that are sized to receive a retaining apparatus discussed further herein.

Second portion 122 includes a first end 140 that is coupled to first portion second end 132 and a second end 142 that is coupled to third portion 124. Second portion 122 has a diameter 144 that is sized such that second portion 122 may be inserted through retaining bushing 112 described further herein. Moreover, second portion 122 has a length 146 that is sized to enable first portion 120 and third portion 124 to extend outwardly from bushing 112 as shown in FIGS. 4 and 5.

Third portion 124 includes a first end 150 that is coupled to second portion second end 142 and a second end 152 that is at least partially inserted into bushing 114. Third portion 124 includes a crowned portion 154 that is coupled proximate to second end 152. In the exemplary embodiment, crowned portion 154 is formed unitarily with third portion 124 and thus also formed unitarily with first and second portions 122 and 124, respectively. Crowned portion 154 extends from third portion second end 152 at least partially toward third portion first end 150. More specifically, crowned portion 154 has a first diameter 160 at second end 152. Crowned portion 154 then gradually tapers outwardly in the direction of first end 150 to an apex wherein crowned portion 154 has a second diameter 162 that is greater than the first diameter 160. Crowned portion 154 then gradually tapers inwardly in the direction of first end 150 until the diameter of the crowned portion is approximately equal to the diameter of second end 152, i.e. diameter 160.

In the exemplary embodiment, crowned portion 154, i.e. the crowned surface of pin 110 which engages bushing 114 facilitates allowing misalignment of the pin centerline with the axis of the bushing diameter while maintaining a line contact, rather than a point contact as in the prior art, thus provides a superior wear surface. Moreover, the crowned portion 154, defined by a relatively large, two inches or greater partial radius, is such that, when a very small amount of radial pin wears occurs, the line contact becomes contact over a relatively large area. This large area then serves to reduce the contact stress level resulting from the axial/ tangential combustor loads and therefore serves to further retard wear and improve durability.

Third portion 124 also includes a platform or shoulder 164 that is coupled proximate to third portion first end 150. In the exemplary embodiment, the shoulder 164 has a diameter 166 that is greater than an inner diameter 168 of bushing 112.

Attachment assembly 100 also includes a washer 170 that is sized to circumscribe at least a portion of alignment pin 110 and a retaining nut 172 that is threadably coupled to first portion to facilitate securing alignment pin 110 to bushing 112.

During assembly, alignment pin third portion 124 is inserted through an, opening in combustor outer casing 116 and is at least partially inserted into bushing 114 such that at least a portion of crowned portion 154 is in contact with bushing 114. More specifically, the crowned portion 154 of alignment pin 110 is now a relatively close diametrical fit to bushing 114. Accordingly, the combustor bushing 114 positional tolerance is accommodated by the axial and tangential clearance that is provided by a space 180 that is defined between the alignment pin 110 and the bushing 112, i.e. the alignment pin "floats" within bushing 112. During assembly, the clearance 180 allows the pin 110 to engage the combustor bushing 114 and thus "finds a home" in the tangential and axial directions relative to the casing. The retaining bushing 112 is then installed which secures the alignment pin in a radial direction with respect to the combustor, The washer 170 and retaining nut 172 are then coupled to the alignment pin 110 to secure the alignment pin 110 in this axial/tangential position.

As a result, the pin/bushing clearance necessary in the prior art design is eliminated, wear capability and durability are improved for any axisymmetric structure pin-mounted connection because all of the pins will share the applied axial and tangential loads, rather than as few as two or three pins sharing the applied axial and tangential loads as shown in the prior art. Moreover, the crowned pin interface surface represents an additional improvement in wear capability.

Figures 7, 8:
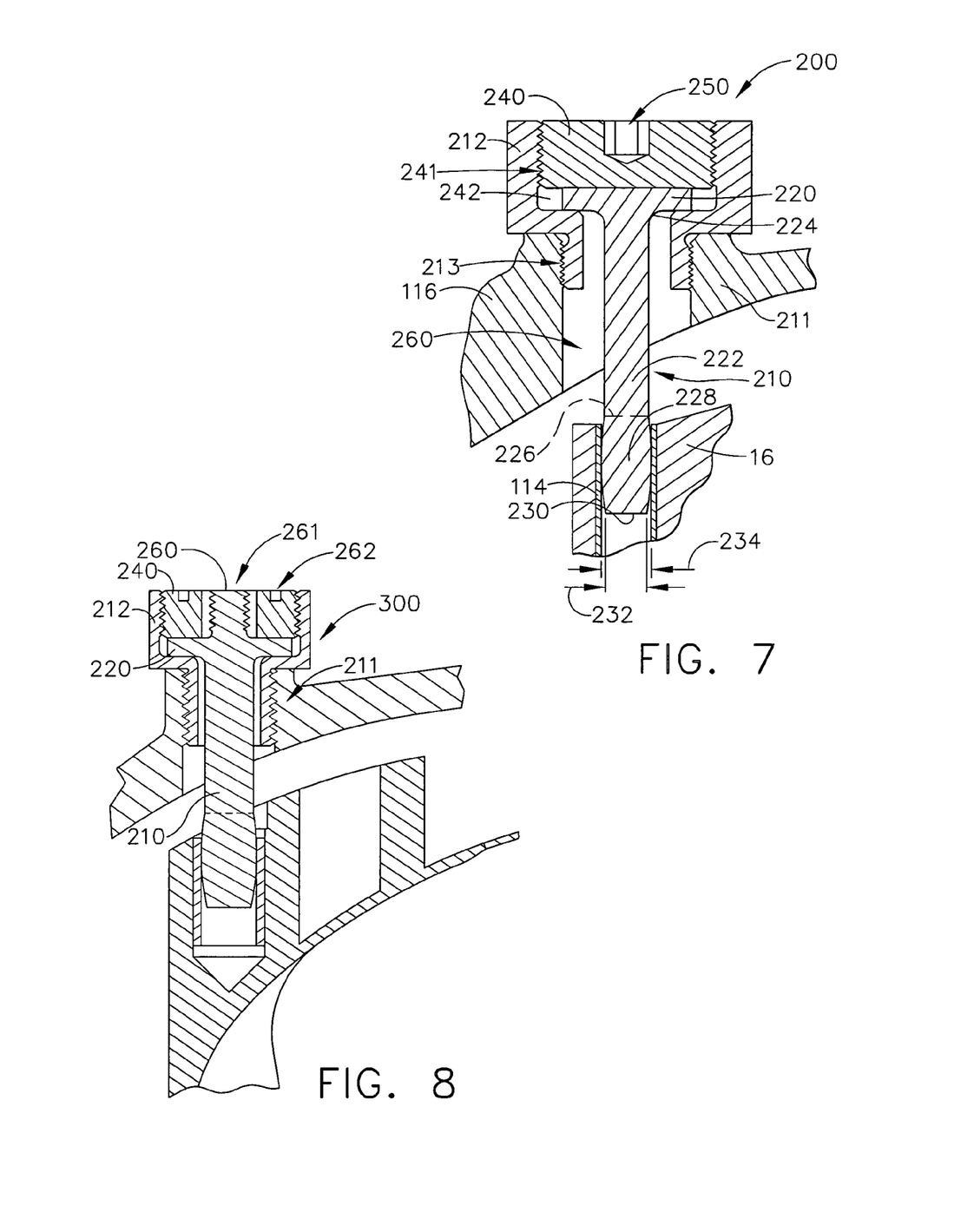
FIG. 7 is a cross-sectional view of an exemplary attachment assembly that may be utilized with the gas turbine engine shown in FIG. 1.
FIG. 8 is a cross-sectional view of the an optional attachment assembly shown in FIG. 7.

FIG. 7 is an exemplary attachment assembly 200 that may be utilized to secure an axisymmetric structure, such as combustor 16 within a gas turbine engine, such as gas turbine engine 10. Although, the attachment assembly is described herein with respect to exemplary gas turbine engine 10, it should be realized that the attachment assembly may be utilized to install and/or align an axisymmetric structure in a wide variety of gas turbine engines.

In the exemplary embodiment, attachment assembly 200 includes a plurality of radially oriented alignment pins 210 that are each inserted through a respective threaded bushing 212 to engage a respective female bushing 114 that is coupled to combustor 16. During assembly, the threaded bushings 212 are threaded into the combustor outer casing 116, which surrounds combustor 16.

More specifically, each alignment pin 210 has a substantially T-shaped cross-sectional profile and includes a head portion 220 that is utilized to secure alignment pin 210 within bushing 212, a shaft portion 222 having a first end 224 that is coupled to head portion 220 and a second end 226 that is coupled to a crowned portion 228;

In the exemplary embodiment, crowned portion 228 is formed unitarily with head portion 220 and shaft portion 222. Crowned portion 228 extends from an end 230 of alignment pin 210 at least partially toward shaft portion 222. More specifically, crowned portion 228 has a first diameter 232 at end 230. Crowned portion 228 then gradually tapers outwardly in the direction of shaft portion 222 to an apex wherein crowned portion 228 has a second diameter 234 that is greater than the first diameter 232. Crowned portion 228 then gradually tapers inwardly in the direction of shaft portion 222 until the diameter of the crowned portion is approximately equal to the diameter of shaft portion 222, i.e. diameter 232.

In the exemplary embodiment, crowned portion 228, i.e. the crowned surface of pin 210 which engages bushing 114, facilitates allowing misalignment of the pin centerline with the axis of the bushing diameter while maintaining a line contact, rather than a point contact as in the prior art, and thus provides a superior wear surface. Moreover, the crowned portion 228, defined by a relatively large, two inches or greater partial radius, is such that, when a very small amount of radial pin wears occurs, the line contact becomes contact over a relatively large area. This large area then serves to reduce the contact stress level resulting from the axial/tangential combustor loads and therefore serves to further retard wear and improve durability. Attachment assembly 200 also includes a retaining device or plug 240 that is sized to couple the pin 210 to bushing 212.

During assembly, bushing 212 is coupled within an opening 211 defined through combustor outer casing 116 using a plurality of threads 213. Crowned portion 228 is inserted through the bushing 212 and is at least partially inserted into bushing 114 such that at least a portion of crowned portion 228 is in contact with bushing 114. More specifically, the crowned portion 228 of alignment pin 210 is now a relatively close diametrical fit to bushing 114. Accordingly, the combustor bushing 114 positional tolerance is accommodated by the axial and tangential clearance that is provided by a space 242 that is defined between the alignment pin head portion 220 and an interior surface of bushing 212. During assembly, the clearance 242 allows the pin 210 to engage the combustor bushing 114 and thus "finds a home" in the tangential and axial directions relative to the casing. The retaining device 240 is then installed which secures the alignment pin 210 in a radial direction with respect to the combustor. Retaining device 240 includes a plurality of threads 241 that are sized to enable the retaining device 240 to be coupled within bushing 212. In the exemplary embodiment, retaining device 240 also includes a recess 250 that is sized to receive a tool to facilitate securing retaining device 240 to bushing 212 and thus to facilitate securing alignment pin 210 within bushing 212. Optionally, retaining device 240 does not include recess 250, rather retaining device 240 includes a portion (not shown) extending from retaining device 240 that is sized to receive a tool that may be utilized to secure retaining device 240 within bushing 212.

In an optional configuration, shown in FIG. 8, head portion 220 includes a disassembly aid 260 that may be utilized by an operator to remove pin 210. More specifically, the disassembly aid 260 includes a threaded extension portion 261 that is formed unitarily with head portion 220 and is configured to allow pin 210 to be removed from bushing 212. Moreover, retaining device 240 may include at least one recess 262 that is sized to receive a tool that may be utilized to secure retaining device 240 within bushing 212.

Figures 9, 10:
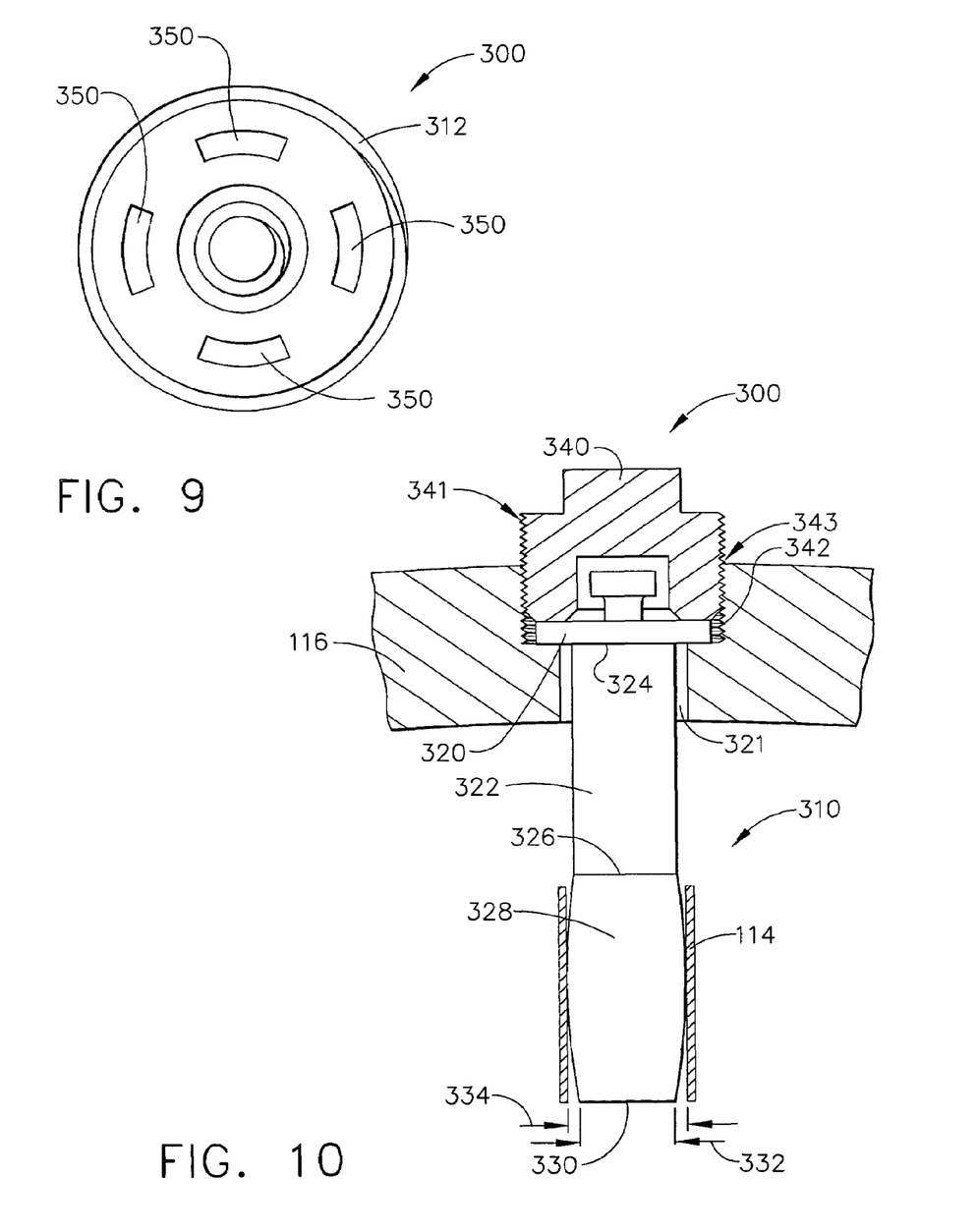
FIG. 9 is a cross-sectional view of an exemplary attachment assembly that may be utilized with the gas turbine engine shown in FIG. 1.
FIG. 10 is a top view of the attachment assembly shown in FIG. 9.

FIG. 9 is top view of an exemplary attachment assembly 300 that may be utilized to secure an axisymmetric structure, such as combustor 16 within a gas turbine engine, such as gas turbine engine 10. FIG. 10 is a cross-sectional view of attachment assembly 300. Although, the attachment assembly is described herein with respect to exemplary gas turbine engine 10, it should be realized that the attachment assembly may be utilized to install and/or align an axisymmetric structure in a wide variety of gas turbine engines.

In the exemplary embodiment, attachment assembly 300 includes a plurality of radially oriented alignment pins 310 that are each inserted through a respective threaded opening 343 to engage a respective female bushing 114 that is coupled to combustor 16 (not shown). During assembly, the alignment pins 310 are threaded into the combustor outer casing 116, which surrounds combustor 16.

More specifically, each alignment pin 310 has a substantially T-shaped cross-sectional profile and includes a head portion 320 that is utilized to secure alignment pin 310 within an opening 321 that is defined in combustor outer casing 116, a shaft portion 322 having a first end 324 that is coupled to head portion 320 and a second end 326 that is coupled to a crowned portion 328.

In the exemplary embodiment, crowned portion 328 is formed unitarily with head portion 320 and shaft portion 322. Crowned portion 328 extends from an end 330 of alignment pin 310 at least partially toward shaft portion 322. More specifically, crowned portion 328 has a first diameter 332 at end 330. Crowned portion 328 then gradually tapers outwardly in the direction of shaft portion 322 to an apex wherein crowned portion 328 has a second diameter 334 that is greater than the first diameter 332. Crowned portion 328 then gradually tapers inwardly in the direction of shaft portion 322 until the diameter of the crowned portion is approximately equal to the diameter of shaft portion 322, i.e. diameter 332.

In the exemplary embodiment, crowned portion 328, i.e. the crowned surface of pin 310 which engages bushing 114, facilitates allowing misalignment of the pin centerline with the axis of the bushing diameter while maintaining a line contact, rather than a point contact as in the prior art, and thus provides a superior wear surface. Moreover, the crowned portion 328, defined by a relatively large, two inches or greater partial radius, is such that, when a very small amount of radial pin wears occurs, the line contact becomes contact over a relatively large area. This large area then serves to reduce the contact stress level resulting from the axial/tangential combustor loads and therefore serves to further retard wear and improve durability. Attachment assembly 300 also includes a retaining device or plug 340 that is sized to be secured within opening 321 that is defined in combustor outer casing 116.

During assembly, crowned portion 328 is inserted through an opening in combustor outer casing 116 and is at least partially inserted into bushing 114 such that at least a portion of crowned portion 328 is in contact with bushing 114. More specifically, the crowned portion 328 of alignment pin 310 is now a relatively close diametrical fit to bushing 114. Accordingly, the combustor bushing 114 positional tolerance is accommodated by the axial and tangential clearance that is provided by a space 342 and 321 that is defined between the alignment pin head portion 320 and an interior surface of opening 321.

During assembly, the clearance 342 allows the pin 310 to engage the combustor bushing 114 and thus "finds a home" in the tangential and axial directions relative to the casing 116. The retaining device 340 is then installed which secures the alignment pin 310 in a radial direction with respect to the combustor. Retaining device 340 includes a plurality of threads 341 that are sized to enable the retaining device 340 to be coupled within an opening 343 defined through combustor outer casing 116.

In the exemplary embodiment, shown in FIG. 9, retaining device 340 also includes a plurality of recesses 350 that are sized to receive a tool to facilitate securing retaining device 340 to combustor outer casing 116. Optionally, retaining device 340 does not include recesses 350, rather retaining device 340 includes a portion (not shown) extending from retaining device 340 that is sized to receive a tool that may be utilized to secure retaining device 340 combustor outer casing 116.

As a result, the pin/bushing clearance necessary in the prior art design is eliminated, wear capability and durability are improved for any axisymmetric structure pin-mounted connection because all of the pins will share the applied axial and tangential loads, rather than as few as two or three pins sharing the applied axial and tangential loads as shown in the prior art. Moreover, the crowned pin interface surface represents an additional improvement in wear capability.

Exemplary embodiments of gas turbine engine axisymmetric structure alignment assemblies are described above in detail. The alignment assemblies illustrated are not limited to the specific embodiments described herein, but rather, components of each alignment assembly may be utilized independently and separately from other components described herein. For example, although a combustor is described herein, the alignment assemblies may also be used to align a variety of interior structure hardware to hardware other than a combustor.

While the invention has been described in terms of various specific embodiments, those skilled in the art will recognize that the invention may be practiced with modification within the spirit and scope of the claims.

What is claimed is:

1. A method for assembling a gas turbine engine, said method comprising:
   coupling a combustor within the gas turbine engine, wherein the combustor includes at least two mounting bushings extending from a radially outer surface of the combustor;
   inserting a pin having a crowned surface at least partially into a respective mounting bushing such that the pin provides both axial and tangential support to the combustor; and
   securing the pin to a combustor outer casing using a threaded bushing.

2. A method in accordance with claim 1 further comprising securing the pin to the combustor outer casing using a threaded fastener.

3. A method in accordance with claim 2 wherein the pin includes a shoulder, said method further comprising securing the pin to the combustor outer casing such that the threaded fastener secures the shoulder against the threaded bushing.

4. A method in accordance with claim 3 wherein a portion of the pin has a first diameter and the threaded bushing has a second diameter that is greater than the first diameter, said method further comprising inserting the pin through the threaded bushing such that the pin is configured to move in both an axial and tangential direction with respect to a gas turbine engine centerline axis.

5. A method in accordance with claim 1 wherein the pin includes a head portion, said method further comprising:
   securing the pin to a combustor outer casing such that the head portion is at least partially inserted into the threaded bushing; and
   securing the pin to the threaded bushing utilizing a threaded plug such that the head portion is movable in both an axial and tangential direction with respect to a gas turbine engine centerline axis inside the threaded bushing.

6. An assembly for coupling a combustor within a gas turbine engine, wherein the combustor includes at least two mounting bushings extending from a radially outer surface of the combustor, said assembly comprises:
   a pin having a crowned surface inserted at least partially into the mounting bushing such that the pin provides both axial and tangential support to the combustor;
   a threaded bushing coupled to said pin; and
   a retaining device to secure said pin to said threaded bushing.

7. An assembly in accordance with claim 6 wherein said pin further comprises a shoulder, said retaining device configured to secure said shoulder against said threaded bushing.

8. An assembly in accordance with claim 7 wherein a portion of said pin has a first diameter and said threaded bushing has a second diameter that is greater than the first diameter, said pin inserted at least partially through said threaded bushing such that said pin is movable in both an axial and tangential direction with respect to a gas turbine engine centerline axis.

9. An assembly in accordance with claim 6 further comprising:
   a pin having a first diameter and a head portion having a second diameter that is greater than the first diameter, and
   a bushing coupled to a combustor outer casing, said head portion at least partially inserted into said threaded bushing such that said head portion is movable in both an axial and tangential direction with respect to a gas turbine engine centerline axis inside said threaded bushing.

10. An assembly in accordance with claim 9 further comprising a plug that is threaded into said threaded bushing to facilitate securing said pin to said gas turbine engine.

11. An assembly in accordance with claim 10 wherein said plug comprises at least one opening that is utilized to secure said plug to said bushing.

12. A gas turbine engine comprising:
   a combustor within said gas turbine engine, wherein said combustor includes at least two mounting bushings extending from a radially outer surface of said combustor; and
   an assembly for coupling said combustor within said gas turbine engine, said assembly comprising:
      a pin having a crowned surface inserted at least partially into the mounting bushing such that said pin provides both axial and tangential support to said combustor;
      a threaded bushing coupled to said pin; and
      a retaining device to secure said pin to said threaded bushing.

13. A gas turbine engine in accordance with claim 12 wherein said pin further comprises a shoulder, said retaining device configured to secure said shoulder against said threaded bushing.

14. A gas turbine engine in accordance with claim 13 wherein a portion of said pin has a first diameter and said threaded bushing has a second diameter that is greater than the first diameter, said pin inserted at least partially through said threaded bushing such that said pin is movable in both an axial and tangential direction with respect to a gas turbine engine centerline axis.

15. A gas turbine engine in accordance with claim 12 wherein said assembly further comprises:

a pin having a first diameter and a head portion having a second diameter that is greater than the first diameter, and a bushing coupled to a combustor outer casing, said head portion at least partially inserted into said threaded bushing such tat said head portion is movable in both an axial and tangential direction with respect to a gas turbine engine centerline axis inside said threaded bushing.

16. A gas turbine engine in accordance with claim 15 further comprising a plug that is threaded into said threaded bushing to facilitate securing said pin to said gas turbine engine, said plug comprises at least one opening that is utilized to secure said plug to said bushing.

* * * * *

UNITED STATES PATENT AND TRADEMARK OFFICE
CERTIFICATE OF CORRECTION

PATENT NO. : 7,637,110 B2
APPLICATION NO. : 11/290115
DATED : December 29, 2009
INVENTOR(S) : Czachor et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 936 days.

Signed and Sealed this

Ninth Day of November, 2010

David J. Kappos
*Director of the United States Patent and Trademark Office*